(12) United States Patent
Gomez-España Collignon (10) Patent No.: US 7,673,424 B2
(45) Date of Patent: Mar. 9, 2010

(54) MOBILE STRUCTURE

(76) Inventor: Carlo Gomez-España Collignon, Mimosas No. 840, Col. Santa Margarita, Zapopan, Jalisco, 45130 (MX)

( * ) Notice: Subject to any disclaimer, the term of this patent is extended or adjusted under 35 U.S.C. 154(b) by 70 days.

(21) Appl. No.: 11/587,799

(22) PCT Filed: Dec. 9, 2004

(86) PCT No.: PCT/MX2004/000090
§ 371 (c)(1),
(2), (4) Date: Oct. 28, 2006

(87) PCT Pub. No.: WO2006/016794
PCT Pub. Date: Feb. 16, 2006

(65) Prior Publication Data
US 2007/0252374 A1 Nov. 1, 2007

(30) Foreign Application Priority Data
Aug. 9, 2004 (MX) .................... JL/A/2004/000024

(51) Int. Cl.
*E04H 1/00* (2006.01)
*E04H 1/12* (2006.01)
*E04B 1/343* (2006.01)

(52) U.S. Cl. .............................. 52/143; 52/79.5; 52/22; 52/169.12; 52/653.1

(58) Field of Classification Search .................. 52/79.5, 52/143, 169.12, 22, 293.1, 293.3, 298, 653.1, 52/317
See application file for complete search history.

(56) References Cited

U.S. PATENT DOCUMENTS 2,931,077 A * 4/1960 Murray ........................... 52/86

3,692,354 A * 9/1972 Tuerk ........................... 296/36

(Continued)

FOREIGN PATENT DOCUMENTS

GB 2054689 * 2/1981

*Primary Examiner*—Richard E Chilcot, Jr.
*Assistant Examiner*—Mark R Wendell
(74) *Attorney, Agent, or Firm*—Steins & Associates, P.C.

(57) ABSTRACT

The invention relates to a mobile structure which is intended for various different uses and purposes and which is of the type that comprises a flat floor chassis with wheels, towing means such that it can be towed by a vehicle and floor support means. The invention is characterized in that the structure comprises: an upper structural shell consisting of two outer frames and at least one intermediate frame, which are connected at the top by lateral and central longitudinal joists, and crossbars forming a plurality of upper cavities which are covered either by laminar sections or skylight elements; and a plurality of independent panels forming the walls of the structure, which are disposed around the structural shell and which can take the form of solid panels or panels comprising a window, a door or an air-conditioning system. The panels are disposed peripherally around the structural shell such that adjacent panels are joined as well as being connected at the bottom to peripheral assembly means belonging to the floor of th chassis and fixed in place using coupling means. The panels are made from frames comprising a pair of hollow lateral posts which are equipped with a plurality of longitudinal grooves on the inner face thereof (racks) and which are connected by a plurality of crossbars and external, internal and lateral cover sheets. The aforementioned racks are designed to receive hooks, supports or brackets or similar furnishings and interior fittings.

20 Claims, 11 Drawing Sheets

U.S. PATENT DOCUMENTS

| | | | | |
|---|---|---|---|---|
| 3,697,098 A * | 10/1972 | Fisher | | 280/415.1 |
| 3,955,845 A * | 5/1976 | Werner | | 296/10 |
| 3,968,989 A * | 7/1976 | Schippers | | 296/29 |
| 5,205,103 A * | 4/1993 | Burton | | 52/749.12 |
| 5,297,836 A * | 3/1994 | Parry-Williams | | 296/203.01 |
| 5,724,774 A * | 3/1998 | Rooney | | 52/79.5 |
| 5,934,026 A * | 8/1999 | Green | | 52/143 |
| 5,960,593 A * | 10/1999 | Murphy | | 52/79.5 |
| 6,035,590 A * | 3/2000 | Lindsay | | 52/143 |
| 6,088,974 A * | 7/2000 | Kloeden, Sr. | | 52/143 |
| 6,256,960 B1 * | 7/2001 | Babcock et al. | | 52/592.1 |
| 2002/0139058 A1 * | 10/2002 | Mori | | 52/79.1 |
| 2007/0044391 A1 * | 3/2007 | Richardson et al. | | 52/79.1 |

* cited by examiner

MOBILE STRUCTURE

FIELD OF THE INVENTION

The present invention relates to installations and mobile spaces used for various purposes. More particularly it is related to mobile rolling cottage structures destined for diverse uses and purposes such as offices, containers, restrooms, mobile homes, exhibition rooms, etc.

BACKGROUND OF THE INVENTION

Before the present invention, a type of trailer mobile structure was well-known, which comprise a chassis with axles and wheels, four sheet walls—two lateral, one in the front, one on the back, and a horizontal roof, joined by a variety of means in vertical posts of the support structure, and are best known as trailers, and generally these trailers resemble hollow cellars that are typified on the inside by ordinary furniture, which are placed inside the trailer in a random way, generally without being fixed to the trailer.

Such furniture inevitably needs lower supports such as legs, multiple means of attaching such as screwing, brackets, etc. and in case air conditioning is desired, it is necessary to cut the existing wall to install it in the hole created by the cut, the same occurs in case that is intended to install additional doors or windows.

Such mobile stations, cottages or trailers, are delivered as "big boxes" that do not have with any means for adding to the basic adaptations, which reduces the versatility of the inner space, besides in the case of wiring for electric energy, voice and/or data, the wires will remain visible to the occupants of the trailers.

Because of all the previously problems, it was necessary to create a new multifunctional mobile rolling trailer that primarily solves the inconveniences described and further that could offer large significant advantages from it's structural, functional and versatility aspects and further for its design and configuration of accessories and interior equipment perspective.

OBJECTIVES OF THE INVENTION

The present invention has as main objective to make available a structure of mobile rolling trailer that functions as a means of loading and as means of housing interior equipment, to adapt to specific interior necessities.

Another objective of the invention is to further provide a mobile rolling structure, that has a simple structure in which a variety of furniture and interior accessories can be easily stored without the need of additional affixation means that can be quick and easily removed, to vary the configuration and distribution of the areas.

Another objective of the invention is to further provide a mobile rolling trailer structure, that can accept external structural modifications for the distribution and location of air conditioning, windows, doors, before or after its delivery to the final users, without the need of making any alteration to the sheets that comprise the bodywork structure.

Also it is another objective of the present invention to provide such mobile rolling cottage structure, that further allows the manipulation of structural elements of the ceiling depending on the lighting, voice and data needs.

Another objective of the present invention, is the capacity of interconnection and expansion of the interior space, that will be achieved by fusing two mobile cottages of the type that constitutes the present invention, since it comprises replaceable elements that easily dissassemble, to allow for the interconnection of two or more mobile stations to have a growth in the interior space, without affecting the original structure of each fused cottage.

And in general all those qualities and objectives that will become apparent carrying out a description of the present invention supported in the modalities illustrated.

BRIEF DESCRIPTION OF THE INVENTION

In general, the structure of the mobile rolling cottage according to the present invention, comprises a flat floor chassis, with at least one pair of wheels and towing means in the front so it can be towed by a vehicle; an upper structural shell consisting of two outer frames and at least one intermediate frame, which are connected at the top by lateral and central longitudinal joists, and crossbars forming a plurality of upper cavities which are covered either by laminar sections, a layer of polyurethane foam as insulation and an intern ceiling or by skylight elements as required; a plurality of panels forming the walls of the structure, that are arranged around such structural shell, that can consist of blind panels, panels with window, panels with door, glass panels or panels with air conditioning boxes, which are adapted in their upper part connect to the upper part of the shell interconnecting joint panels by coupling means and adapting to assembly means dispersed in the floor of the chassis and fixed in place using coupling means.

The aforementioned perimeter cover panels that make up the walls of the mobile structure, consist of frames formed by a pair of hollow lateral posts which are equipped with a plurality of longitudinal grooves formed on the inner face thereof (racks), and which are connected by a plurality of crossbars, adapted to receive an external aluminium sheet, an intermediate sheet of polyurethane foam as an insulator and on top of it a cover that will have an interior surface of a variety of materials such as wood, carpet, sheet, glass, as well as a pair of lateral packing members.

The aforementioned panels are inserted by their upper side substantially in a diagonal form with the body inside out in an inverted groove fixed inwardly in such lateral longitudinal joists that join the outer and intermediate frames of such upper structural shell, it is then straightened and arranged vertically over the flat floor of the chassis where the posts are received by coupling means and fixed to the flat floor with screw means; said screw means also fixing joint panels.

The plurality of longitudinal grooves of the internal face (racks) of the post that form the frames of the plurality of panels that form the walls of the mobile structure, allow the receipt of hooks, brackets, squares related to the furniture and the internal equipment, these hooks are easily mounted in the internal part of the mobile structure by means of gravitational affixation that will allow the selective distribution, disposition, location and required height, without having to use means such as brackets, screwing, etc., which will optimize in great measure the internal space.

The internal cover of the perimeter cover panels that constitute the walls of the mobile structure, may be blinds, may comprise windows, doors or air conditioning, may be of a variety of finishes such as plywood with aluminium frames, sheetrock, carpet, aluminium panels, plastic, textile, among others.

The flat floor of the chassis may be covered with a vinyl tile, hardwood, ceramic tile, etc.

The furniture adapted to hook and mount in the posts (racks) of the panels as it was described before, may consist in cabinets, desks, shelves, etc., which will provide additional space underneath them by not requiring any additional attachment means.

Given that the panels are formed by the frame contains hollow posts, as well as the layers that conform them, and in the same way the layers of the ceiling, these elements create intern cavities that can house internally and in an unseen way, the wiring of the electrical, voice, data, installations, hydraulic installation ducts, etc.

Such rolling mobile structure has the particular aspect of being able to join with at least another structure of the same coupling characteristics, either by lateral or longitudinal joining, this is achieved by simply removing the panels from the enclosed sides of the corresponding similar structure and by means of an attachment system between the vertical posts that remain enclosed within the upper structural shell of each cottage, once the attachment of the structures is achieved it provides at least double the internal space achieving greater dimensions. Since the sets of wheels of each cottage do not extend beyond the lateral edges of the flat floor of the chassis of each cottage, they do not interfere with the wheels of adjacent adjoined cottages, thereby allowing the perfect union of two or more similar cottages.

According to the previous description it is feasible the lateral union of two or more similar cottages, meaning that it is possible to interconnect two cottages laterally at its corresponding joining side and in the external sides two other cottages may be interconnected, and so on, up to where it is desired and required, achieving large internal spaces suitable for a variety of purposes. In the same way two cottages may be longitudinally interconnected meaning the back edges of two cottages may be interconnected as previously described and at the same time to this cottages may be laterally interconnected more cottages forming internal spaces much larger and without expansion limit.

For a better comprehension of the invention, a brief description of it is provided, showing in the drawings that with illustrative purposes, that are not intended to be restrictive to the present description.

For a better comprehension of the invention, we will proceed to make a detailed description of one of its modalities, shown in the drawings for illustrative purposes though not considered to be restrictive of the present description.

DETAILED DESCRIPTION OF THE INVENTION

According to the present invention, the characteristic details of the structure of the mobile rolling cottage are clearly shown in the next description and in the illustrative drawings that are enclosed, serving the same signs of reference to indicate the same parts that are referred to.

Figure 1:
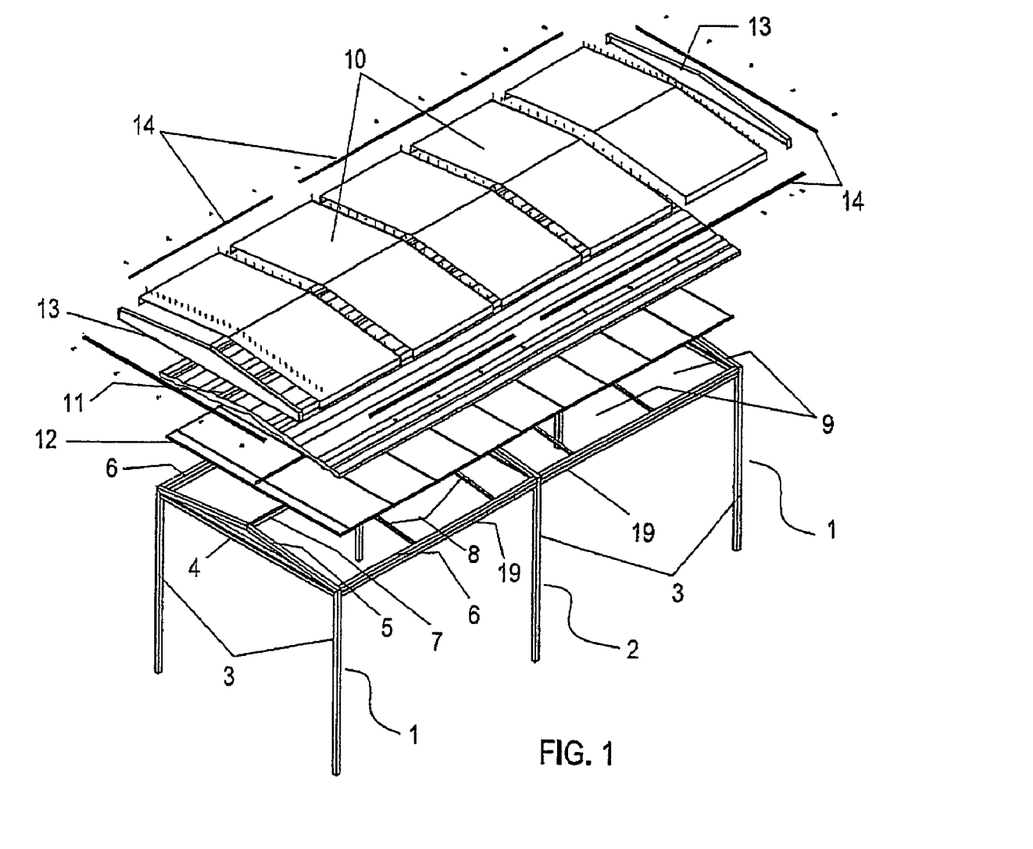
FIG. 1 shows an exploded view of the upper structural shell of the rolling mobile cottage.

Making reference to the FIG. 1 that shows an explosive of the upper structural shell of the mobile rolling cottage. In such figure, upper structural shell of the mobile rolling cottage, according to the preferred modality of the invention, is formed bye two outer frames 1 (front and back) and at least one intermediate frame 2, each frame formed by a pair of lateral posts 3, one first upper horizontal joist 4 and a second upper angled joist 5 that provides the shape of the roof or any similar element as a semi-parabolic roof; these frames being interconnected on the upper part by lateral longitudinal joists 6, one central longitudinal joist 7 and a plurality of joists 8 that generate a plurality of upper cavities 9, which are externally covered by laminar sections or one sole aluminium plate 10, and internally comprising a layer of polyurethane foam 11 and an inner ceiling 12, as well as laminar covers 13 arranged in the front and back to cover the space created between the mentioned first horizontal upper joist 4 and the mentioned second angled upper joist 5; comprising besides peripheral angled water collecting canals 14.

Figure 2:
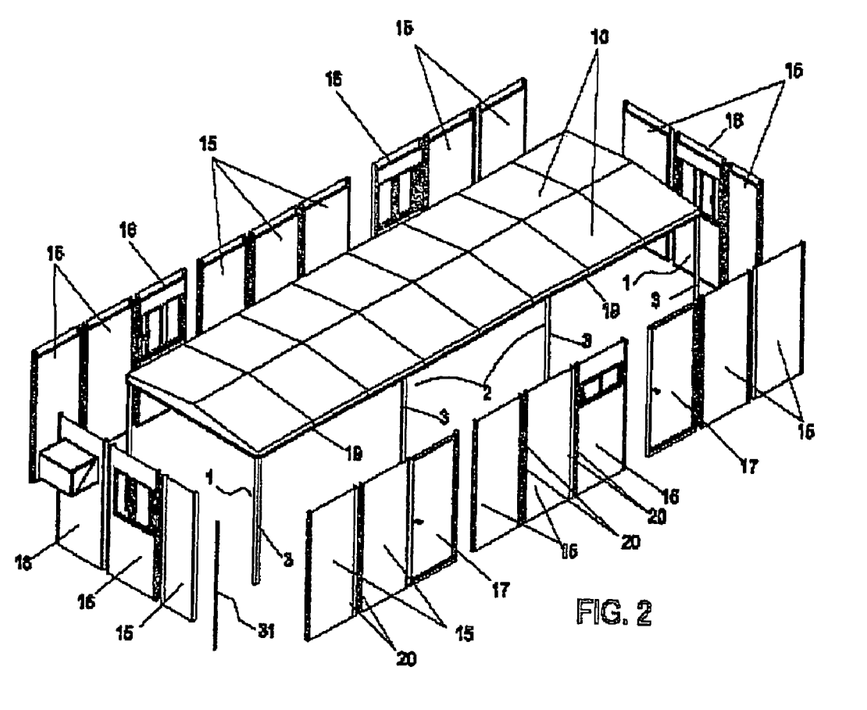
FIG. 2 illustrates a perspective view of the upper structural shell with the assembled ceiling and the plurality of perimeter cover panels that constitute the walls of the mobile cottage, in the coupling process.
Figure 2A:
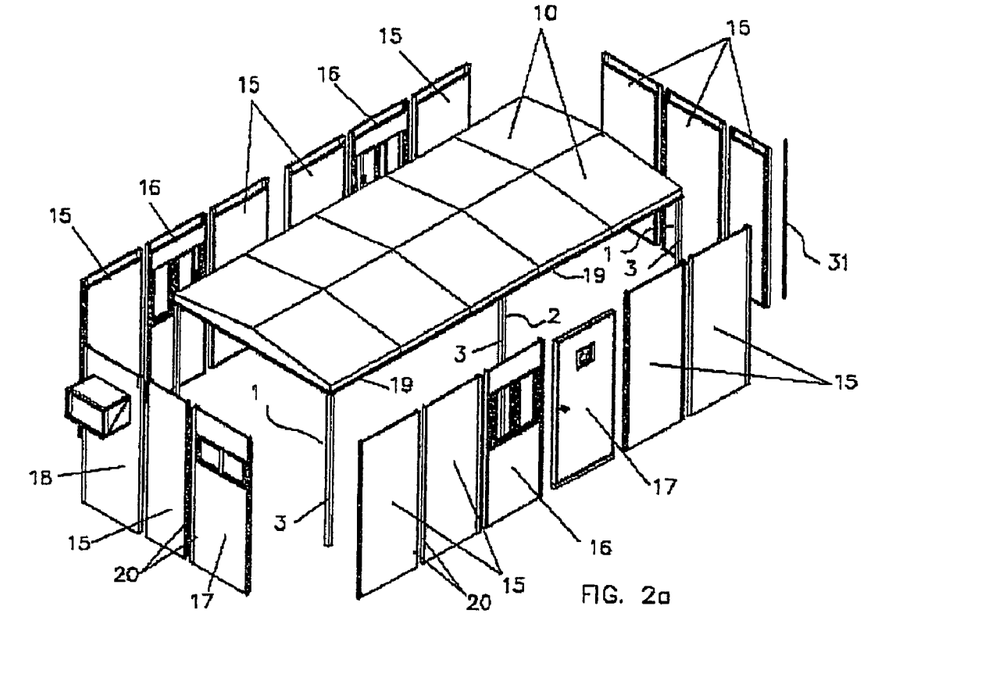
FIG. 2a illustrates a perspective view of the upper structural shell with ceiling and a plurality of panels that constitute the walls of the cottage, in coupling process, in another of the modalities.

In reference to the FIGS. 2 and 2a that illustrate a conventional perspective of the upper structural shell with assembled ceiling and with the plurality of perimeter panel covers that constitute the walls of the mobile cottage, in coupling process. In these figures, the upper structural shell comprises the pre-assembled ceiling, so that the laminar aluminium sections or completed plate 10 form the ceiling, even though in case of being assembled by means of laminar sections, some of them can be removed and in their place a skylight (not shown) may be set up according to the needs of interior lighting. The posts 3 of such outer frames 1 and the intermediate frames 2 (this version includes two intermediate frames) are vertically arranged as support elements for the ceiling.

A plurality of perimeter cover panes (lateral, front and back) that comprise the walls of the cottage, are arranged around the mentioned structural shell, consisting of blind panels 15, panels with windows 16, panels with doors 17 or panels with air conditioning boxes 18, which are adapted in their upper part to the inverted grooves 19 formed in the lower face of the mentioned lateral longitudinal joists 6 (see FIG. 1) that interconnect the mentioned frames 1 and 2 of the structural shell, and interconnecting adjoining panels by its posts 20 through coupling means (not shown).

Figure 3:
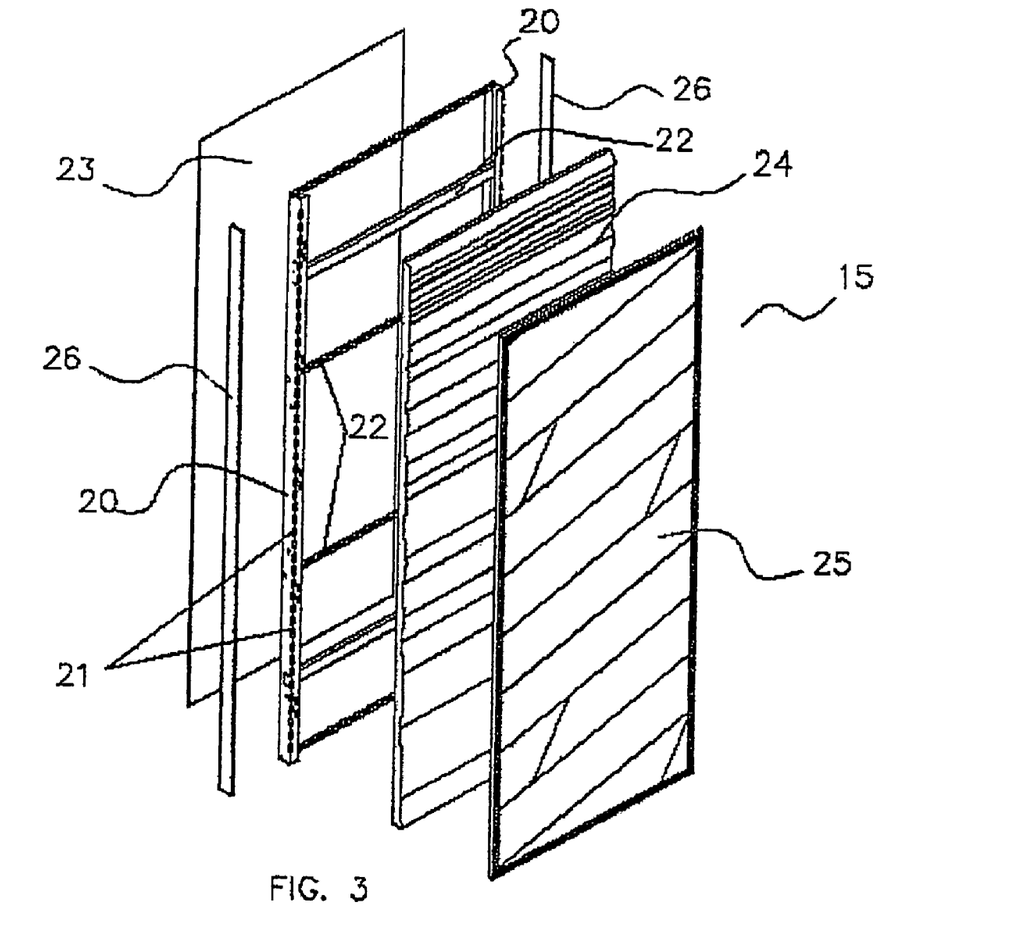
FIG. 3 illustrates an exploded view of a blind cover panel that constitutes the walls of the mobile cottage.
Figure 3A:
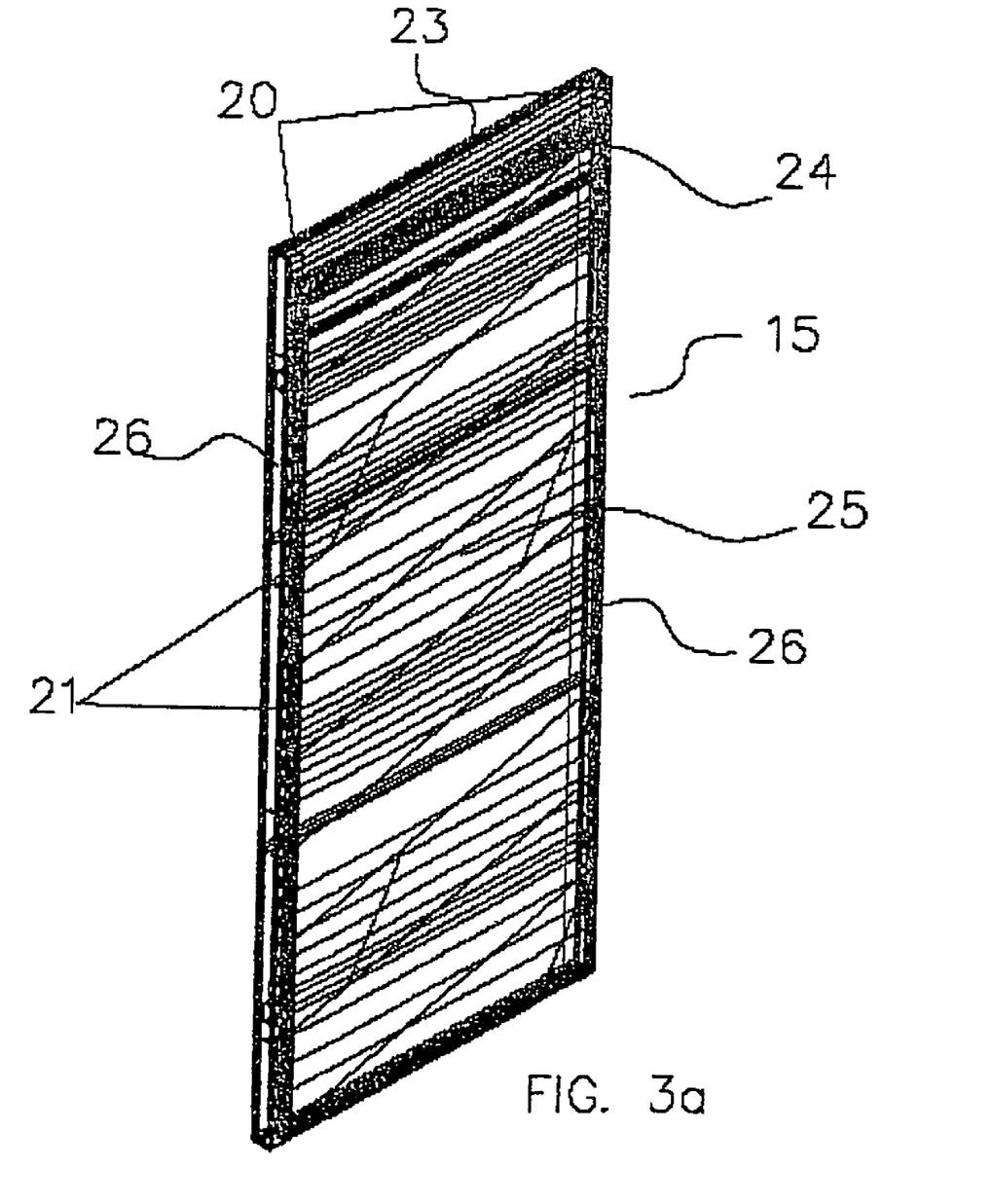
FIG. 3a shows a perspective view of the blind cover panel showed in FIG. 3.

Making reference to the FIGS. 3 and 3a that illustrate an exploded and assembled perspective, respectively, of a blind cover panel that may constitute the walls of the mobile cottage. In such figures, the blind panel 15 of the perimeter cover that comprise the walls of the mobile cottage, is formed by a frame that comprises a series of longitudinal dies 21 arranged in their internal face (racks), interconnected by a plurality of joists 22, adapted to receive an outer aluminium sheet 23, a internal layer of polyurethane foam 24 and over this a cover 25 made from a variety of materials, as well as a pair of lateral packing members 26.

Figure 4:
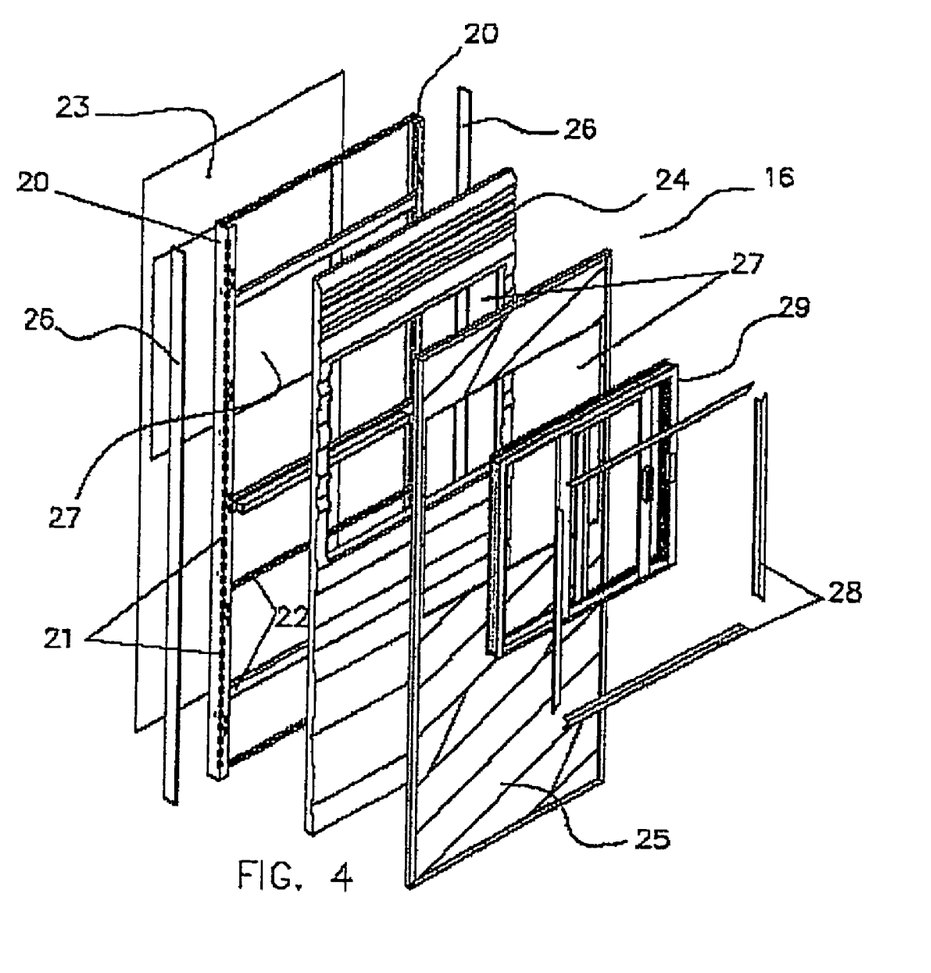
FIG. 4 shows an exploded view of a cover panel with window which constitutes the walls of the mobile cottage.
Figure 4A:
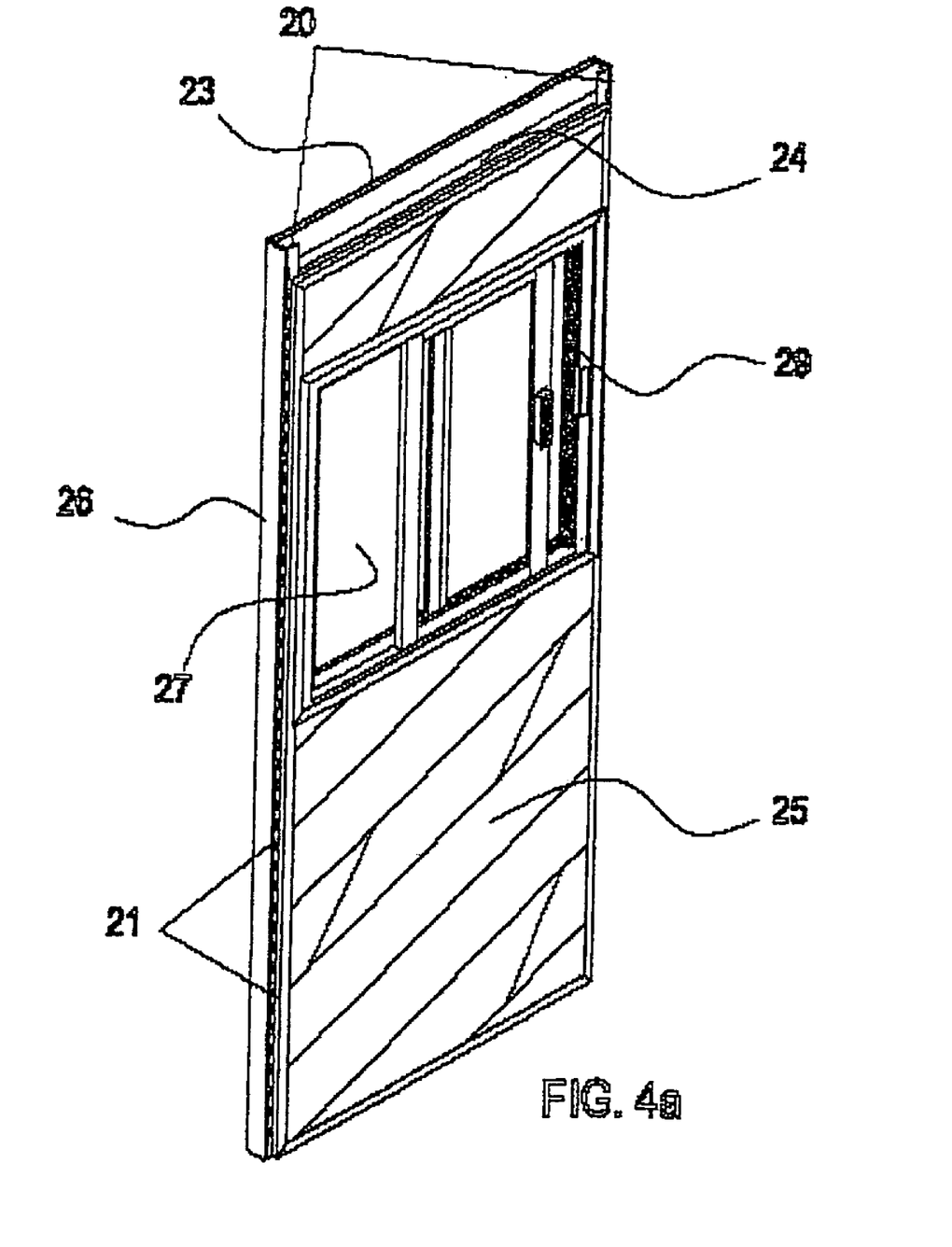
FIG. 4a illustrates a perspective view of the cover panel with window, depicted in FIG. 4.

Making reference to the FIGS. 4 and 4a that show and exploded and assembled perspective views, respectively, a cover panel with window that may constitutes the walls of the mobile cottage. In such figures, the panel with window 16 is structured similarly to the blind panel shown and described in FIGS. 3 and 3a, and the previous paragraph, the outer aluminium sheet 23, the polyurethane foam intermediate layer 24 and the internal cover 25 of a variety of materials, that are mounted in the mentioned frame formed by a pair of lateral hollow posts 20 that include a plurality of longitudinal grooves 21 formed in their internal face (racks), interconnected by a plurality of joists 22, that comprise a substantially rectangular opening 27 where is a frame 28 is located that receives a window 29 of sliding pane or any other desired configuration, perhaps comprising fold-up sheets.

Figure 5:
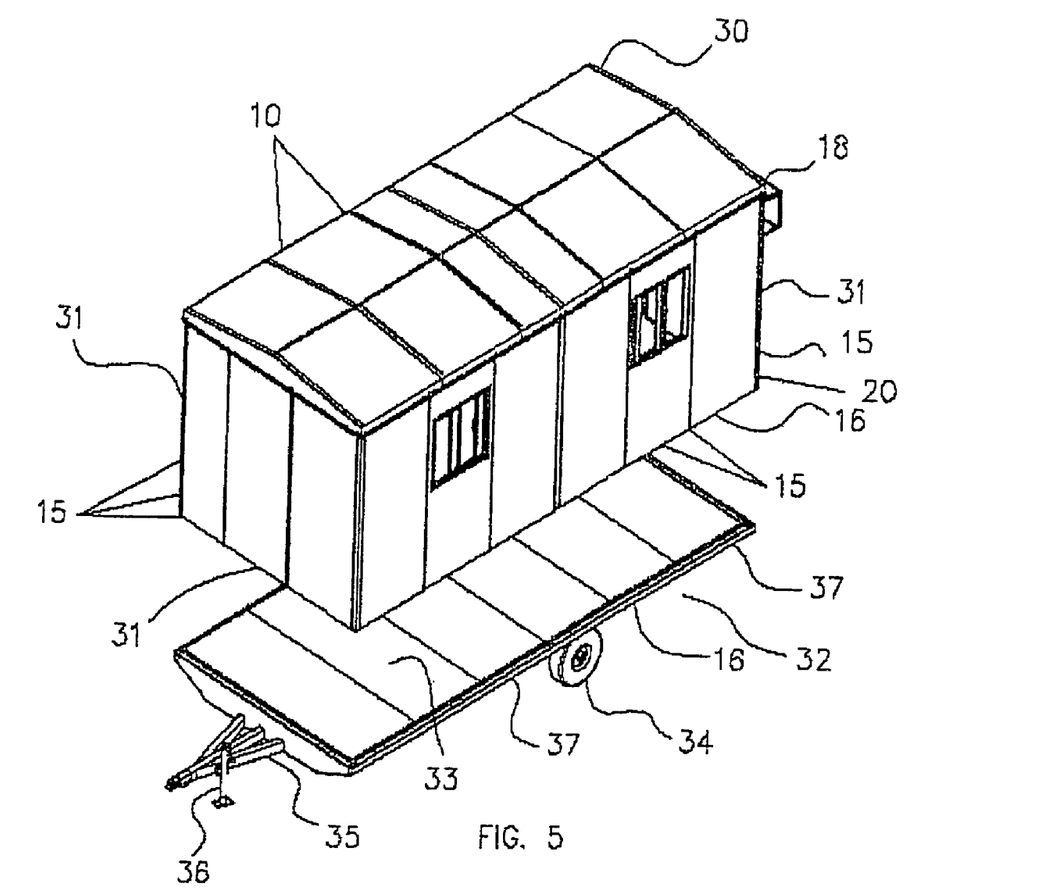
FIG. 5 illustrates a perspective view of the upper structure of the mobile cottage joined in another configuration of the panels, just before coupling with the upper part to the flat floor chassis.

Making reference to the FIG. 5 that illustrates a perspective view of the upper structure of the fully assembled mobile cottage in another panel configuration, just before attachment to the upper surface of the flat floor chassis. In this figure, the upper part of the fully assembled mobile rolling cottage, is formed by the roof 30 configured as described in the section of the FIG. 1, and the plurality of perimeter cover panels (lateral, front and back) that constitute the walls of the cottage, arranged around the structural shell, that consist in blind panels 15, panels with window 16, panels with door 17 or panels with air conditioning boxes 18, the upper portion of all of which attach to the inverted grooves 19 formed in the lower face of the longitudinal lateral joists 6 (see FIG. 1) and in the first upper horizontal joist 4 (see FIG. 1) that join the frames (not shown) of the structural shell, interconnecting adjoined panels by its posts 20 through coupling means (not shown) and comprising shelves in the shape of a "T" 31.

The upper structure of the mobile cottage, adapts and affixes over a flat floor 33 of the chassis 32, that comprises at least a pair of wheels 34 and pulling means 35 with support 36. The posts 20 of each panel are adapted to be inserted into assembling means 37 arranged peripherally around the floor 33 of the chassis and affixed therein with coupling means (not shown).

Figure 6:
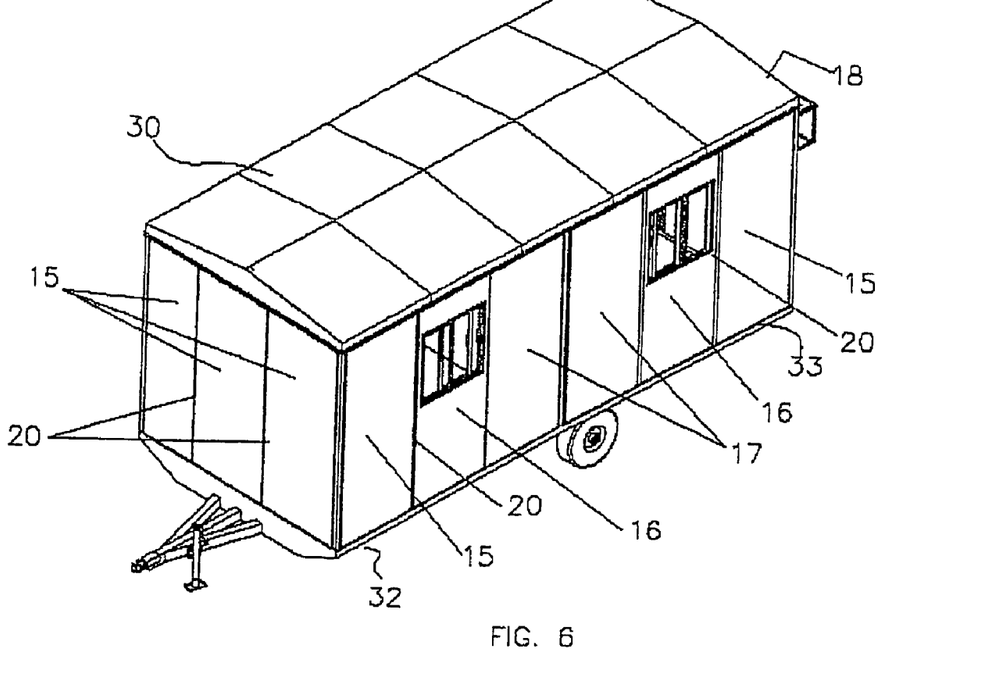
FIG. 6 illustrates a perspective view of the mobile rolling cottage completely interconnected, according to FIG. 5.

Making reference to the FIG. 6 that illustrates a conventional perspective view of the mobile rolling cottage completely assembled, as shown in the FIG. 5. In this figure the chassis 32 supports the plurality of blind panels 15, panels with window 16, panels with door 17 or panels with air conditioning boxes 18, dispersed between the flat floor 33 and the ceiling 30, comprising the mobile rolling cottage.

The plurality of longitudinal posts 20 having internal grooves that conform the plurality of panels that form the walls of the mobile cottage (racks), that are configured to receive the hooks, brackets, squares or like such that furniture and internal equipment, that are easily hook-mounted to the interior of the mobile cottage in the distributions, orientations, locations and heights required.

Figure 7:
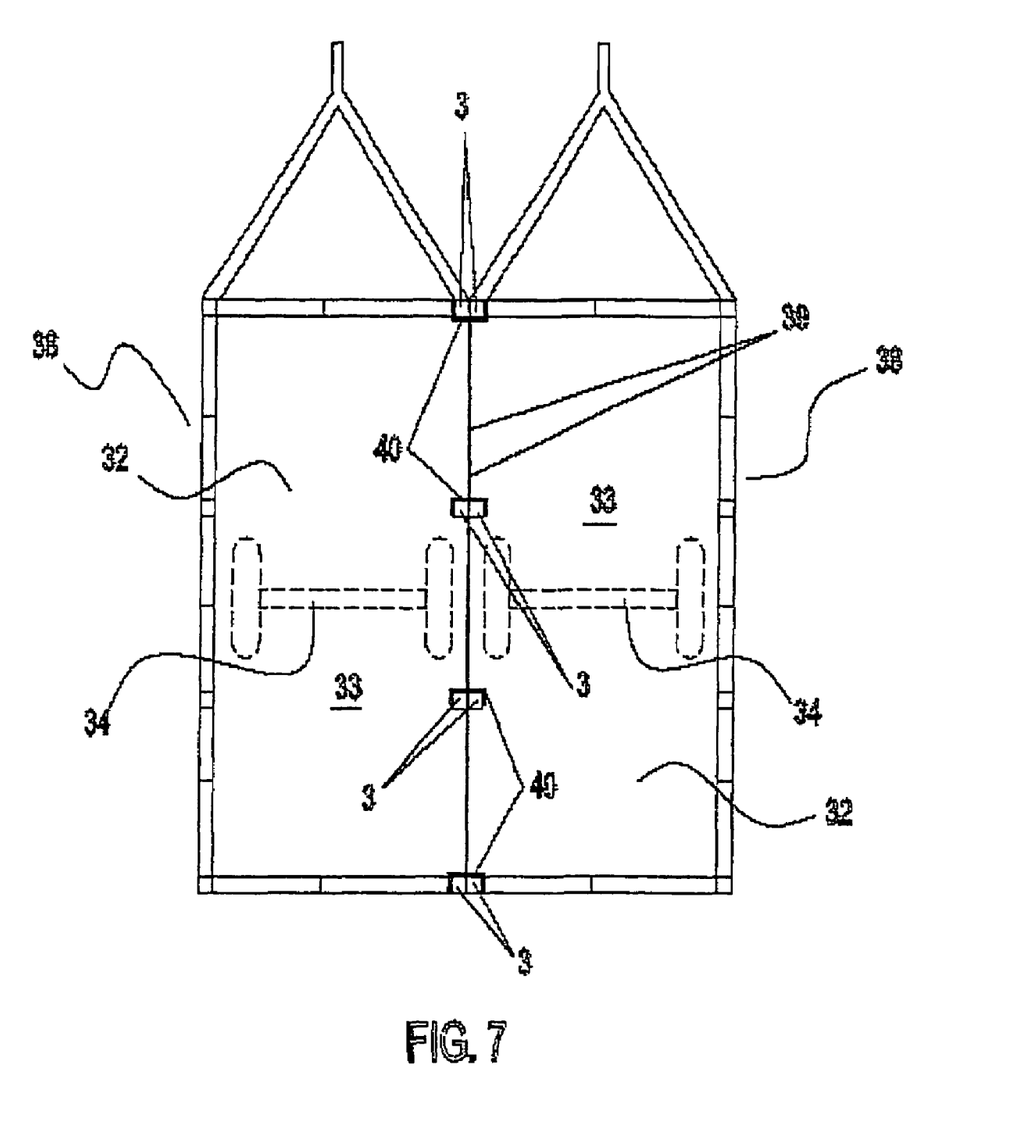
FIG. 7 illustrates a bottom view of the lateral union of two joined cottages, eliminating the ceiling structure only for illustrative purposes.

Making reference to FIG. 7 that illustrates a bottom view lateral union of two adjoined cottages, eliminating the ceiling structures only for illustrative purposes. In this figure, two similar cottages 38 structured as described in previous figures, are joined laterally eliminating the panels (either blind panels, panels with window, panels with door, panels with air conditioning or a mix of these) of the adjoining sides 39 of the corresponding similar cottages and by pressure brackets or any other holding means 40 are fixed to the vertical posts 3 of the upper structural shell of each adjoined cottage, creating an internal space of greater dimensions. Since the pair of wheels 34 of each adjoined pair 38 do not extend beyond the lateral edges of the flat floor 33 or chassis 32 of each cottage, they do not interfere one with the other, thereby encouraging the union of two or more similar cottages.

Figure 8:
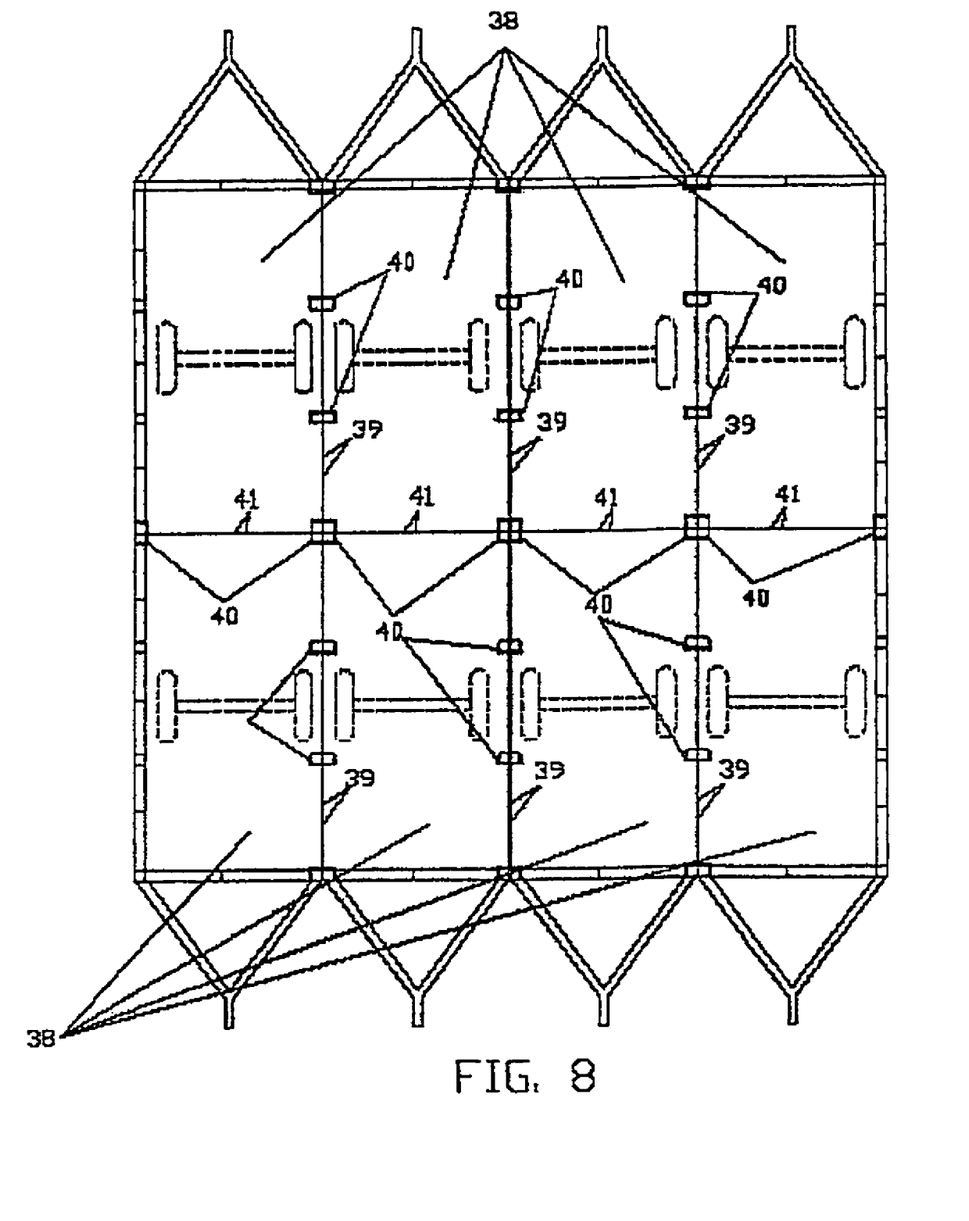
FIG. 8 illustrates a bottom view of the union of more than two cottages in transversal form and longitudinally, eliminating the upper ceiling structures for illustrative purposes only.

Making reference to the FIG. 8 that illustrates a bottom view of the union of more than two cottages in transverse and longitudinal arrangement, eliminating the upper structures of the ceiling only for illustrative purposes. In this figure, the cottages may be interconnected longitudinally and transversally (in lateral form) in other words the back edge 41 and the adjoined sides 39 of each 38 adjoined cottage may be interconnected in a way that the corresponding panels are eliminated and by means of pressure brackets or other holding means 40 joining the vertical adjoined posts of the upper structural shell of each cottage, thereby generating a much greater interior space.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A rolling mobile cottage comprising a flat floor chassis with at least a pair of wheels, towing means such that the cottage can be towed by a vehicle, and support means attached to said chassis, said support means comprising an independent upper structural shell formed by two outer frames and at least one intermediate frame, interconnected at their upper part by longitudinal lateral and central joists, and crosspieces said longitudinal lateral and central joists and said crosspieces forming a roof frame for said upper structural shell, at least two of said longitudinal lateral joists defined by an inverted groove formed in their bottom side, said joists and crosspieces arranged to generate a plurality of upper cavities where covers or skylight elements are fixed; a plurality of independent cover panels comprising the exterior walls of the cottage arranged around said structural shell by insertion at their upper edges into a said longitudinal groove, said panels selected from a group including blind panels, panels with window, panels with door or panels with air conditioning boxes, which are arranged all along said structural shell, said shell formed by interconnecting adjoined panels at their posts by coupling means and inserting the post bottom ends into perimeter assembling means on the chassis floor and attached with coupling means; said panels being formed by frames that comprise a pair of lateral hollow posts having longitudinal grooves formed on their internal face and, interconnected by a plurality of crosspieces and outer, inner and lateral covers; this plurality of grooves being adapted to receive hooks or brackets on the interior walls of the cottage.

2. The rolling mobile cottage according to the claim 1, further comprising said inner and outer covers of each said plurality of cover panels comprising the walls of the cottage, consisting of an outer aluminium sheet, an intermediate insolating layer of polyurethane foam and an inner cover of separate material, as well as a pair of lateral packing members.

3. The rolling mobile cottage according with claim 1, further comprising said ceiling covers consisting either of outer aluminium laminar sections or one sole laminar piece, an intermediate layer of polyurethane foam isolating material and an inner ceiling of skylight elements as desired.

4. The rolling mobile cottage according to the claim 2, further comprising said inner cover of the perimeter cover panels that constitute the walls of the mobile cottage is selected from the group consisting of laminated wood with aluminium frames, sheetrock, aluminium panels, plastic, and tapestry.

5. The rolling mobile cottage according to claim 1, further comprising said flat floor chassis being covered with material selected from the group consisting of vinyl tile, hardwood, and ceramic tile.

6. The rolling mobile cottage according to the claim 1, further comprising said posts of the panels are hollow and the layers that form them, as well as the layers of the ceiling, leave internal spaces wherein wiring of electric installations, voice and data, and ducts of hydraulic installation may be housed.

7. The rolling mobile cottage according to the claim 1, further comprising said outer frames and at least one intermediate frame of said upper structural shell of the cottage, are comprised by a couple of lateral posts, a first upper horizontal crosspiece and a second upper angled crosspiece that forms the shape of a peaked ceiling; said lateral longitudinal joists comprising said inverted channel to receive the upper portion of said panels.

8. The rolling mobile cottage according to the claim 1, further comprising said at least one pair of wheels are arranged in such way that they do not extend beyond the lateral edges of the flat floor chassis.

9. The rolling mobile cottage according to the claim 1, further comprising two or more said cottages of similar configuration are joined whether sideways or lengthwise, eliminating said panels of the adjoined sides of said corresponding similar cottages and by attachment means attaching the adjoined vertical posts of the upper structural shell of each adjoined cottage are interconnected, to generate a much larger interior space.

10. A rolling mobile cottage comprising:
a flat floor chassis with at least a pair of wheels, towing means such that the cottage can be towed by a vehicle; and
support means attached to said chassis, said support means comprising:
an independent, free-standing upper structural shell formed by two outer frames and at least one intermediate frame, interconnected at their upper part by longitudinal lateral and central joists, and crosspieces that generate a plurality of upper cavities where covers or skylight elements are fixed, said longitudinal lateral joists further defined by inverted grooves formed in the lower face thereof; and
a plurality of independent cover panels comprising the exterior walls of the cottage arranged around said structural shell, said panels selected from a group including blind panels, panels with window, panels with door or panels with air conditioning boxes, said cover panels being arranged all along said structural shell, said shell formed by inserting an upper portion of each said panels into said lateral joist inverted grooves, and interconnecting adjoined said panels at their posts by coupling means and inserting the post bottom ends into perimeter assembling means on-the chassis floor and attaching with coupling means.

11. The rolling mobile cottage of claim 10, wherein said panels are formed by frames that comprise a pair of lateral hollow posts having longitudinal grooves formed on their internal face and, interconnected by a plurality of crosspieces and outer, inner and lateral covers; this plurality of grooves being adapted to receive hooks or brackets on the interior walls of the cottage.

12. The rolling mobile cottage according to the claim 11, further comprising said inner and outer covers of each said plurality of cover panels comprising the walls of the cottage, consisting of an outer aluminium sheet, an intermediate insolating layer of polyurethane foam and an inner cover of separate material, as well as a pair of lateral packing members.

13. The rolling mobile cottage according with claim 11, further comprising said ceiling covers consisting either of outer aluminium laminar sections or one sole laminar piece, an intermediate layer of polyurethane foam isolating material and an inner ceiling of skylight elements as desired.

14. The rolling mobile cottage according to the claim 11, further comprising said inner cover of the perimeter cover panels that constitute the walls of the mobile cottage is selected from the group consisting of laminated wood with aluminium frames, sheetrock, aluminium panels, plastic, and tapestry.

15. The rolling mobile cottage according to claim 11, further comprising said flat floor chassis being covered with material selected from the group consisting of vinyl tile, hardwood, and ceramic tile.

16. The rolling mobile cottage according to the claim 11, further comprising said posts of the panels are hollow and the layers that form them, as well as the layers of the ceiling, leave internal spaces wherein wiring of electric installations, voice and data, and ducts of hydraulic installation may be housed.

17. The rolling mobile cottage according to the claim 11, further comprising said at least one pair of wheels are arranged in such way that they do not extend beyond the lateral edges of the flat floor chassis.

18. The rolling mobile cottage according to the claim 11, further comprising two or more said cottages of similar configuration are joined whether sideways or lengthwise, eliminating said panels of the adjoined sides of said corresponding similar cottages and by attachment means attaching the adjoined vertical posts of the upper structural shell of each adjoined cottage are interconnected, to generate a much larger interior space.

19. The rolling mobile cottage according to claim 10, wherein said coupling means attaching to said perimeter assembling means are screws.

20. The rolling mobile cottage according to claim 19, wherein said coupling means are screws.

* * * * *